United States Patent [19]

Wells

[11] Patent Number: 4,801,129

[45] Date of Patent: * Jan. 31, 1989

[54] LEAF SPRING CLAMP WITH ATTACHMENT MEANS

[75] Inventor: Wayne E. Wells, Farmington Hills, Mich.

[73] Assignee: Ford Motor Company, Dearborn, Mich.

[ * ] Notice: The portion of the term of this patent subsequent to Aug. 4, 2004 has been disclaimed.

[21] Appl. No.: 5,186

[22] Filed: Jan. 20, 1987

[51] Int. Cl.$^4$ .......................... B60G 11/02; F16F 1/36
[52] U.S. Cl. ........................................ 267/52; 267/158
[58] Field of Search .................. 267/43, 44, 45, 47, 267/52, 148, 149, 158; 249/173; 411/501

[56] References Cited

U.S. PATENT DOCUMENTS

| | | |
|---|---|---|
| 206,778 | 8/1978 | English et al. . |
| 952,139 | 3/1910 | Rice . |
| 1,458,149 | 6/1923 | Reed . |
| 1,512,109 | 10/1924 | Laher . |
| 1,727,019 | 9/1929 | Shore . |
| 1,970,765 | 8/1934 | Parkhill . |
| 2,106,411 | 1/1938 | O'Donnell .. |
| 2,280,347 | 4/1942 | Olley et al. . |
| 2,533,511 | 12/1950 | Rowland et al. . |
| 2,562,721 | 7/1951 | Jakosky ............................... 411/501 |
| 2,571,475 | 10/1951 | O'Donnell . |
| 2,600,843 | 6/1952 | Bush . |
| 2,643,111 | 6/1953 | Burton . |
| 2,654,597 | 10/1953 | Barenyi . |
| 2,829,881 | 4/1958 | Morris . |
| 3,061,301 | 10/1962 | Bajer et al. . |
| 3,142,598 | 7/1964 | Rosen . |
| 3,231,291 | 1/1966 | Kozicki et al. . |
| 3,250,546 | 5/1966 | Allison . |
| 3,377,060 | 4/1968 | Sherwood . |
| 3,437,333 | 4/1969 | Koch et al. . |
| 3,541,605 | 11/1970 | Mohl . |
| 3,586,307 | 6/1971 | Brownyer . |
| 3,602,523 | 8/1971 | Poulos . |
| 3,751,021 | 8/1973 | Foster . |
| 3,762,266 | 10/1973 | Thellmann .......................... 411/501 |
| 3,968,958 | 7/1976 | Huchette et al. . |
| 4,146,118 | 3/1979 | Zankl ................................. 411/501 |
| 4,221,041 | 9/1980 | Hufnagl et al. ..................... 411/501 |
| 4,489,922 | 12/1984 | Fesko . |
| 4,512,699 | 4/1985 | Jackson et al. ..................... 411/501 |
| 4,519,590 | 5/1985 | Wells .................................. 267/149 |
| 4,575,057 | 12/1985 | Robertson . |
| 4,684,110 | 8/1987 | Sale et al. ............................ 267/52 |

FOREIGN PATENT DOCUMENTS 1406405 of 1965 France .
54-141944 11/1979 Japan .
104207 of 1963 Netherlands .

*Primary Examiner*—Andres Kashnikow
*Assistant Examiner*—Mark T. Le
*Attorney, Agent, or Firm*—Peter D. McDermott; Roger L. May

[57] ABSTRACT

An improved leaf spring clamp is provided, particularly for use with composite material leaf springs, to securely fix the position of the leaf spring relative to a wheel axle or other suspension system member, such as in the suspension system of a motor vehicle. The leaf spring clamp comprises a rigid clamp plate. The clamp base forms a channel adapted to receive the wedge insert. The inner surface of at least one side wall of the clamp base fairs from both ends into a channel-widening concavity, preferably at the longitudinal midpoint of the channel. The wedge insert forms an inner channel adapted to laterally jacket the leaf spring. The outer surface of the wedge insert substantially fills the clamp base channel, providing a convexity adapted to register with the channel-widening concavity of the clamp base. The clamp plate attaches to the clamp base to clamp the leaf spring between them under a pre-load. The clamp plate and clamp base together comprise pin-and-hole means such that they can easily be attached to each other to yield a degree of compressive pre-load on the resilient insert.

12 Claims, 2 Drawing Sheets

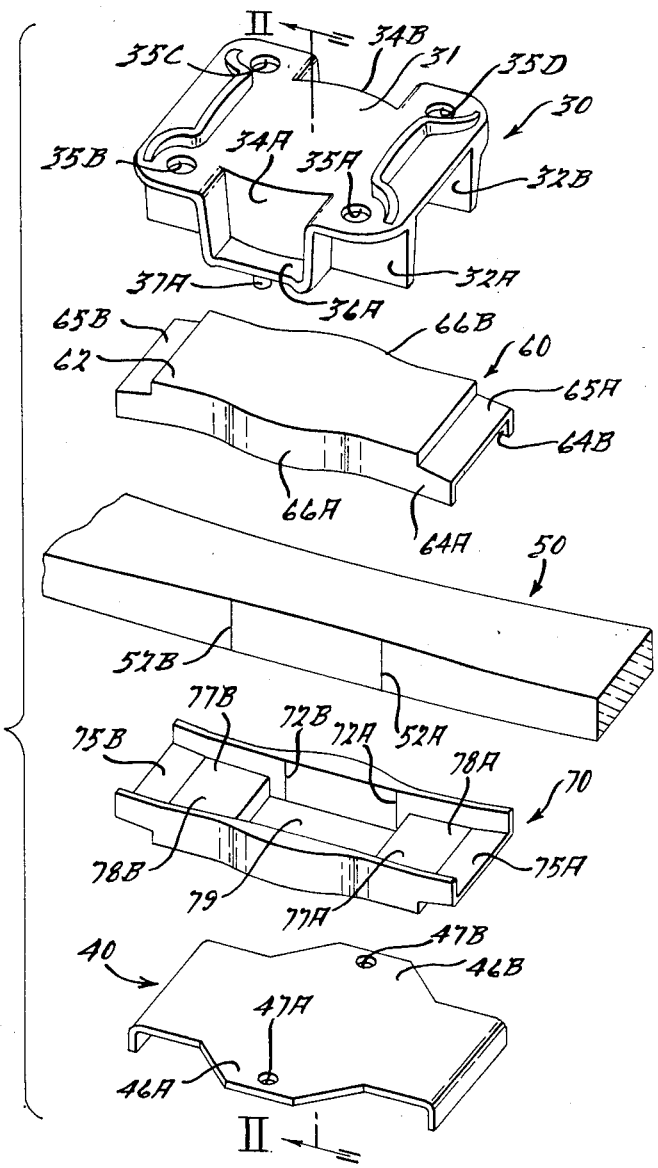
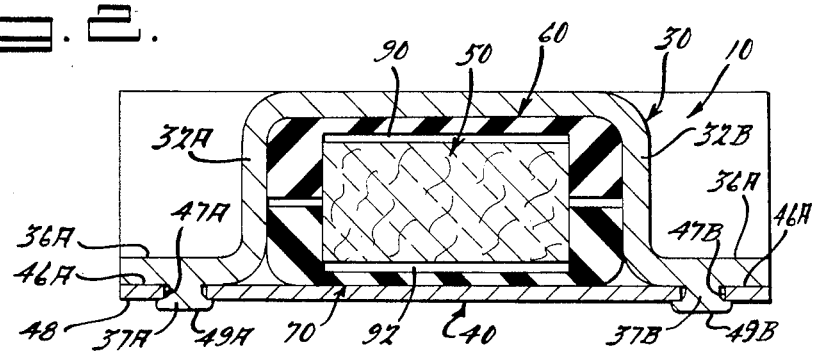
FIG. 1.
FIG. 2.

LEAF SPRING CLAMP WITH ATTACHMENT MEANS

TECHNICAL FIELD

This invention relates to a leaf spring clamp adapted to fix the position of a leaf spring in a suspension system, especially a filament reinforced composite material leaf spring, without damage to or dislocation of the reinforcing filaments or resin matrix of the leaf spring. The leaf spring clamp of the invention is especially suitable for use as an axle clamp in motor vehicle suspension systems

BACKGROUND

Composite material leaf springs are known and typically comprise a filler material, for example glass roving or other filamentary solids, in an organic resin matrix such as thermoplastic or, more typically, thermosetting plastic. Such springs are known, for example, in U.S. Pat. Nos. 2,600,843, 2,829,881, 3,142,598, 4,489,922 and 4,575,057. Known methods of making composite material leaf springs include, for example, filament winding, compression molding and pultrusion.

In the past, composite material leaf spring have been used in motor vehicle suspension systems with associated hardware to hold the spring accurately in position. Such spring clamping hardware has been fashioned after hardware previously known for use in conjunction with metal leaf springs. In a typical arrangement, the spring is positioned between a clamping plate on one side and the axle or other wheel carrying member on the other side. Often, a second clamping plate or the like is positioned between the spring and the axle to act as a spring seat. Bolts or the like, for example, U-bolts, are used to clamp the clamping plate and spring to the axle An abrasion resistant pad can be used between the spring and the axle (or spring seat) Exemplary clamping hardware for a composite material leaf spring is seen, for example, in U.S. Pat. Nos. 3,968,958, 3,586,307 and 3,541,605.

Known leaf spring clamping hardware has been found inadequate in certain respects for use in conjunction with composite material leaf springs Specifically, such spring clamping hardware has been found inadequate to hold the spring in a fixed Position relative the axle under conditions experienced in ordinary use. More specifically, known spring clamping hardware often has failed to prevent longitudinal movement of the spring, that is, movement of the spring in a direction along its longitudinal axis (which typically is transverse to the longitudinal axis of the axle). Movement of the composite material leaf spring relative the axle or other wheel carrying member in a direction along the longitudinal axis of the leaf spring would change the pivot point of the leaf spring against the axle. Consequently, the spring rate would be altered and the spring would fail to perform according to design. Moreover, upon flexure of the spring, the compressive and tensile stresses would be improperly distributed, which could lead to increased material fatigue and decreased spring life. Moreover, if excessive, such movement could lead to damage to a vehicle powertrain.

A leaf spring clamp suitable for use with a composite material leaf spring is disclosed in commonly assigned U.S. Pat. No. 4,519,590 to W. E. Wells. Therein, a leaf spring axle clamp assembly is disclosed to comprise a rigid clamp base which forms a channel to jacket the leaf spring, and a resilient insert which is inserted between the leaf spring and the rigid clamp base. The resilient insert fills substantially entirely the space between the leaf spring and the rigid clamp base and employs friction and a wedge effect to prevent longitudinal movement of the leaf spring. In commonly assigned U.S. patent application Ser. No. 689,364, patented 12/23/86 U.S. Pat. No. 4,630,804, a similar leaf spring axle clamp assemble is disclosed in which the resilient insert(s) provide voids above the below the leaf spring to accommodate the bending displacement of the leaf spring within the axle clamp assembly. It was found that displacement of the leaf spring within the clamp, especially large bending displacements of the spring, is disadvantageously impeded by the resilient insert without such voids. The resilient insert cannot be eliminated since the leaf spring must be effectively isolated from rigid clamp parts to prevent abrasion and crushing damage to the synthetic material of the spring.

In regard to the aforesaid composite leaf spring clamp assemblies which employ resilient wedge inserts, a measure of compressive pre-load is exerted on the resilient inserts in the assembled axle clamp. The inserts are placed under a compressive pre-load when the clamp plate and clamp base are attached to each other around the resilient wedge inserts and the leaf spring. Such compressive pre-load best achieves the aforesaid friction and wedge effect to secure the leaf spring properly in position within the axle clamp. To achieve such compressive pre-load, U-bolts can be employed to hold the rigid clamp plate and clamp base together (or a preselected distance apart), with the resilient inserts (and leaf spring) sandwiched between them. The torque applied in tightening the U-bolt nuts determines the level of pre-load This feature, however, has been found to present certain difficulties in achieving consistent pre-loading of the clamps during initial assembly. In addition, there is the risk that U-bolt nuts might inadvertently loosen Over time it has been found that the degree of pre-load within the axle clamp assembly can significantly affect the performance characteristics of the leaf spring. Thus, there is a need for a leaf spring clamp of the subject type in which the correct pre-load can be easily achieved and maintained during use over time. On such leaf spring clamp is disclosed in U.S. patent application Ser. No. 803,753, filed Dec. 2, 1985, U.S. Pat. No. 4,684,110, patented on Aug. 4, 1987, in the name of R. F. Sale and W. E. Wells. Therein, the clamp plate and clamp base are provided with corresponding tabs and slots. For assembly of the axle clamp, the tabs are best around into the slots. Such tab-and-slot feature, however, is not readily applicable to axle clamp assemblies employing a clamp plate and clamp base formed of cast metal, such as cast iron. Nevertheless, the use of cast metal components would be advantageous in certain applications in view of their rigidity and strength.

It is an object of the present invention to provide a leaf spring clamp which secures a leaf spring, especially a filament reinforced composite material leaf spring, in position in a suspension system. It is a particular object of the invention to provide an axle clamp assembly which does not require either damage to or dislocation of either the reinforcing filaments or the resin matrix of the leaf spring and, specifically, which does not require a hole through the leaf spring or concavities in the surface of the leaf spring or other complexities in the shape of the leaf spring.

Additional objects and advantages of the invention will be apparent from the following disclosure.

DISCLOSURE OF THE INVENTION

According to the present invention, a leaf spring clamp adapted to secure a leaf spring, especially a composite material leaf spring, in position in a suspension system comprises a rigid clamp base comprising a bottom wall and two side walls, the side wall being substantially parallel to each other and each extending from the bottom wall to form therewith a longitudinal channel, wherein an inner surface of at least one of the side walls fairs from each longitudinal end into a channel-widening concavity. A resilient wedge insert, in one or more pieces, which is adapted to be positioned within and to register with the longitudinal channel formed by the clamp base, comprises a bottom wall adapted to lie adjacent to and in substantial contact with the inner surface of the clamp base bottom wall and two side walls being substantially parallel to each other and each extending upwardly from the bottom wall of the wedge insert to form therewith an inner longitudinal channel adapted to jacket the leaf spring; laterally. The inner surface of each of the wedge insert side walls is adapted to contact the leaf spring along substantially the entire longitudinal dimension of the inner channel, and the outer surface of each side wall of the wedge insert is adapted to lie adjacent to and in substantial contact with the inner surface of the corresponding clamp base side wall. That is, the wedge insert side walls register with each channel-widening concavity of the corresponding, i.e. adjacent, clamp base side wall, so as to substantially fill each such channel-widening concavity. The wedge insert comprises another portion which, together with the above-described first portion, substantially encircles the leaf spring laterally The leaf spring clamp assembly further comprises a substantially rigid clamp plate adapted to be fixedly attached to the clamp base to clamp a leaf spring between them within the aforesaid inner channel.

According to a characterizing aspect of the invention, the aforesaid rigid clamp base provides flanges extending outwardly from its aforesaid side walls, which flanges, in assembly, are adjacent to and coplanar with corresponding flange portions of the clamp plate. The corresponding flange portions of the clamp plate comprise outward extensions either in the plane of the clamp plate or offset therefrom. While the clamp base flange and clamp plate corresponding portions optionally provide bolt holes to receive U-bolts or the like for assembly, it is a characterizing aspect of the invention that on each side of the axle clamp assembly the clamp base flanges and the corresponding flange portions of the clamp plate are so positioned as to provide a desired, pre-selected pre-load when in assembly in contact with (or closely proximate) each other. The clamp base flanges and the corresponding flange portions of the clamp plate provide pin-and-hole means for fixing the clamp plate and clamp base to each other. More specifically, either the clamp base flanges or the corresponding flange portions of the clamp plate provide pins (one or more on each side) and the other rigid member provides correspondingly Positioned holes. The pins are sufficiently long to extend through the holes during assembly of the axle clamp prior to placing the resilient insert under compressive pre-load. Such pin-and-hole means of the axle clamp has been found to provide simple, effective control of axle clamp pre-load. To assemble the axle clamp, the clamp plate and clamp base are pressed into contact and the pins are "spin-formed" or "spin riveted" according to well known methods (or otherwise deformed) to fix the clamp plate flange portions and clamp base flanges in contact with each other (or nearly in contact with each other). In preferred embodiments there is no need to measure the torque applied to U-bolt nuts or to measure the gap between the clamp plate and clamp base, since the proper amount of compressive pre-load is easily and consistently achieved by the pin-and-hole means. Thus, the intended, specified performance of the leaf spring held in the clamp is more consistently achieved and maintained during use over a period of time. It will be apparent in view of the above disclosure, that either the clamp plate or the clamp base may provide the pins and the other provide the corresponding holes. It will also be apparent that whichever of the two rigid components is formed of cast metal and provides the pins, the other may also be of cast metal or, in some cases, may be suitably formed of materials other than cast metal by metal stamping techniques or other known methods.

The leaf spring clamp of the present invention is seen to be particularly advantageous in view of its ability to fix or secure the position of a leaf spring, particularly a filament reinforced composite material leaf spring, without damaging either the reinforcing filaments or the resin matrix of the leaf spring. It is particularly advantageous that the clamp provides such position-fixing function without the necessity of being bolted to the leaf spring or otherwise positively attached to it. This advantage is significant since it has been found that the presence of bolt holes in or through the leaf spring and like interruptions and dislocations in the filament reinforced synthetic material of a composite material leaf spring at the axle clamp area can significantly reduce the strength, structural integrity and durability of the leaf spring. Also, the additional fabrication time, complexity and cost required to provide such attachment means is avoided. Accordingly, leaf springs for use with the leaf spring clamp of the present invention can be designed smaller and of lighter weight for a given application. Reduced material costs and reduction in weight are highly significant advantages in applications such as motor vehicle suspensions, for which the present invention is especially well suited.

Other features and advantages of the invention will become more apparent from the following, detailed description thereof and from the drawings illustrating the preferred embodiments and best mode of carrying out the invention.

BRIEF DESCRIPTION OF THE DRAWINGS

FIG. 1 is an exploded view, in perspective, of a leaf spring clamp assembly according to a preferred embodiment of the present invention, shown in conjunction with a leaf spring (partially broken away).

FIG. 2 is an elevation view, in cross-section, of the assembly of FIG. 2 (shown in non-exploded view) taken through line II—II.

DESCRIPTION OF PREFERRED EMBODIMENTS

Figure 3:
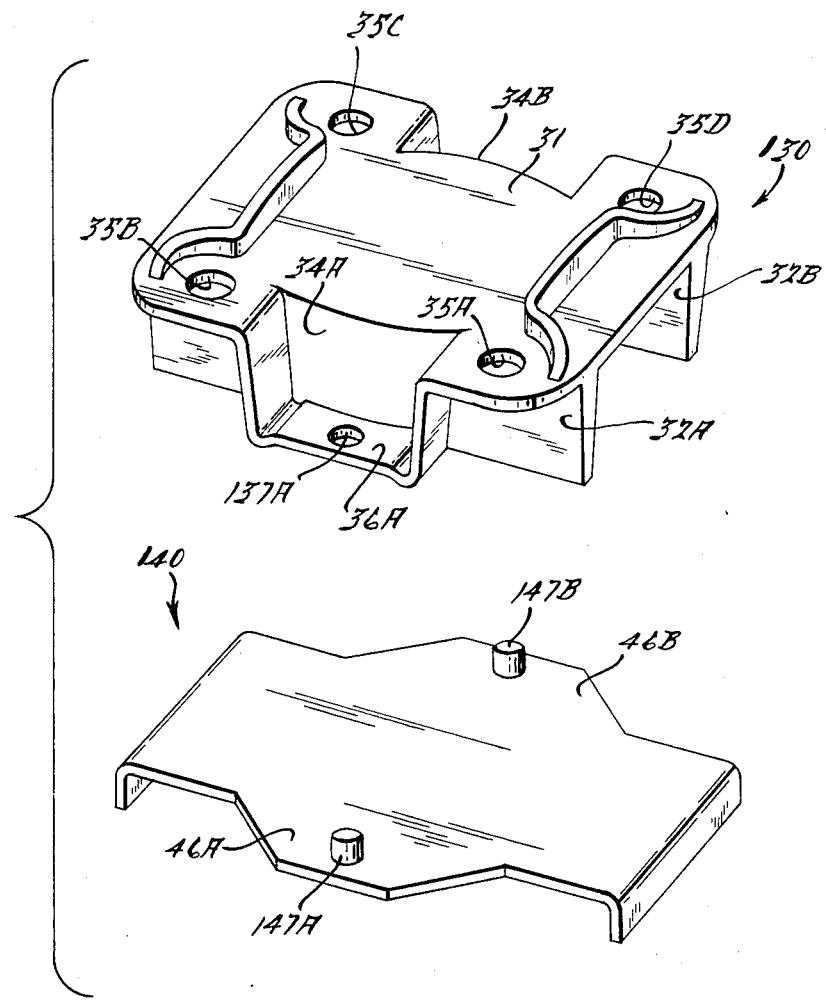
FIG. 3 is a perspective view of an alternative embodiment of certain components of the leaf spring clamp assembly of FIG. 1.

Referring now to the drawings, axle clamp 10 (also referred to as a leaf spring clamp or axle clamp assembly) is seen to comprise an upper rigid member, clamp base 30, and a lower rigid member, clamp plate 40. A leaf spring 50 is sandwiched between the upper and lower rigid members. A wedge insert comprising resilient inserts 60 and 70 is positioned mediate the leaf spring and the upper and lower rigid members to cushion the leaf spring from the rigid clamp members during flexure of the leaf spring. These inserts can be symmetrical and can be identical, as in the preferred embodiment shown, to reduce the cost and complexity of manufacture, storage, assembly, etc. Clamp plate 40 is adapted to be secured, such as by welding or other known means, to a support member such as an axle member in a motor vehicle suspension system The clamp base has a bottom wall 31 (which, although so called, appears at the top of FIGS. 1 and 2) and parallel side walls 32A, 32B extending from the bottom wall to form therewith a channel. The channel is adapted to receive resilient inserts 60 and 70. Since composite material leaf springs typically are of substantially rectilinear cross-section at the axle clamp, the side walls of the clamp base typically will be substantially perpendicular to the bottom wall thereof and, correspondingly, the side walls of the wedge insert will be substantially perpendicular to the bottom wall of the wedge insert. The inner surface of each side wall of the clamp base provides a channel-widening concavity 34A, 34B (seen as convexities outside the clamp base as viewed in FIG. 1). That is, the channel-side surface of the side wall fairs into a lateral concavity such that the channel formed by the bottom wall and side walls of the clamp base becomes laterally wider at the longitudinal ends of the clamp base (i.e., at the ends of the channel). Preferably, the two side walls of the clamp base provide symmetrical and centrally disposed channel-widening concavities, as shown in FIG. 1. Preferably, each such concavity gradually and continuously widens as one moves longitudinally from the edge of the channel to the midpoint of the channel and thereafter gradually and continuously narrows to its original width at the opposite end. Preferably, the depth of the concavity in the side wall of the clamp base is uniform in a direction normal to the bottom wall of the clamp base. That is, the channel typically should be of uniform lateral dimension (i.e., width) over the entire height of the side wall. Suitable alternative configurations will be apparent to the skilled of the art in view of the present disclosure. In general, a suitable configuration will depend, in part, upon the application to which the axle clamp assembly is to be put and upon the forces likely to be encountered by the leaf spring in normal use. In general, it will be within the ability of those of average skill in the art, in view of the present disclosure, to provide a leaf spring clamp according to the present invention, having a clamp base and wedge insert configuration suitable to substantially fix the leaf spring in position.

The clamp base preferably further provides bolt holes 35A, 35B, 35C and 35D for assembly or mounting of the leaf spring clamp. Suitable means such as, for example, U-bolts or the like passing through such bolt holes can be used according to certain embodiments to secure the leaf spring clamp to the carrying axle or other support member of the suspension system in a conventional manner.

The resilient insert 60 has a bottom wall 62 and substantially parallel side walls 64A, 64B extending from the bottom wall to form therewith an inner channel adapted to jacket a leaf spring. As noted above, such inner channel typically will be rectilinear since composite material leaf springs are typically of substantially rectilinear cross-section at the axle clamp. The configuration of the outer surface of the resilient insert is such as to register with, i.e. to lie adjacent to and in substantial contact with, the inner surface of the clamp base. More generally, the wedge insert (comprising, in the embodiment shown, two halves, specifically, identical resilient inserts 60 and 70) should fit tightly within the channel formed by the clamp base. Thus, the outer surface of each side wall of resilient insert 60 provides a convexity 66A, 66B adapted to engage and substantially fill the corresponding channel-widening concavity of the side walls of the clamp base. That is, each side wall of the wedge insert provides a convex portion or region which follows and is adapted to register with the channel-widening concave region of the adjacent side wall of the clamp base. Of course, the clamp base side walls each can provide multiple position-fixing concavities and the wedge insert then preferably would provide convexities corresponding in number and position for each of those multiple concavities. Leaf spring clamps according to such preferred embodiments have been found to function exceptionally well to fix the position of synthetic material leaf springs in the suspension system of a motor vehicle.

The second resilient insert, that is, lower resilient insert 70, as aforesaid, is substantially identical to resilient insert 60. It provides the same features discussed above in describing resilient insert 60 and functions in the same manner.

While not wishing to be bound by theory, it presently is understood that the channel-widening concavity of the clamp base functions together with the convexity provided by the outer surface of the wedge insert side walls to prevent movement of the leaf spring relative to the leaf spring clamp and, thus, relative to the suspension member to which the leaf spring clamp is attached. More particularly, such convexity/concavity feature is seen to prevent longitudinal movement of the leaf spring, that is, movement in a direction along the longitudinal axis of the leaf spring. Movement of the leaf spring would cause corresponding movement of the tight-fitting pre-loaded wedge insert which jackets it. Any such movement of the wedge insert, however, would cause the convex portion of the side walls to be shifted out of the corresponding concavity in the side wall of the clamp base, whereupon the wedge insert would be compressed in upon the jacketed leaf spring. Thus, a wedge effect is provided, whereby longitudinal movement of the spring causes the wedge insert to more tightly grip the sides of the spring and to more strongly resist such longitudinal movement. It will be apparent in view of the foregoing that the entire height of the wedge insert side walls can extend from one of the resilient inserts, rather than be divided such that side walls extend from both the upper and lower resilient inserts, as in the preferred embodiment shown in FIGS. 1 and 2.

The wedge insert is adapted to receive and jacket a leaf spring, typically at about the longitudinal midpoint of the leaf spring. That is, the inner surface of the wedge insert forms an inner channel contoured to contact the corresponding surface of the leaf spring. Typically, a composite material leaf spring will provide an axle attachment region, a central portion of substantially constant width (i.e., substantially constant lateral dimension). Such leaf spring is generally not, however, of constant-width along its entire length but, rather, becomes wider toward each eye of the leaf spring. According to the preferred embodiment of the present invention shown in FIGS. 1 and 2, the leaf spring clamp extends longitudinally over a sufficient portion of the leaf spring to jacket not only the constant-width axle attachment region of the leaf spring but also a length of the wider portion of the leaf spring on either side thereof. The wedge insert is fashioned such that the contour of its inner channel corresponds to the contour of the leaf spring and, thus, the inner channel has a somewhat hour-glass shape in plan view, becoming somewhat wider (i.e., having increased lateral dimension) toward the longitudinal ends of the inner channel. In leaf spring 50 (the ends of which are broken away) lines 52A and 52B indicate the approximate boundary between the central constant-width portion of the leaf spring and the widening portion on either side thereof. Correspondingly, lines 72A and 72B shown in the inner channel formed by the lower resilient insert 70 are the boundary between the central portion of the inner channel adapted to jacket the central constant-width Portion of the leaf spring and the portions of the inner channel on either side thereof which fair outwardly so as to jacket part of the widening Portion of the leaf spring.

While not wishing to be bound by theory, it presently is understood that any longitudinal movement of the leaf spring relative to the clamp would produce a wedge effect, whereby a constantly widening portion of the leaf spring would be attempting to enter the more narrow central portion of the inner channel formed by the wedge insert. Obviously, any such longitudinal movement would be effectively prevented by such wedge effect in combination with the above discussed wedge effect provided by the interaction of the side wall convexity of the wedge insert and side wall concavity of the clamp base.

According to one preferred embodiment, the wedge insert is adhesively bonded to the leaf spring using any of numerous well known and commercially available adhesives. Such adhesive bonding has been found to Prevent squirming of the resilient members and so reduces the mechanical working and consequent deterioration thereof. Also, the adhesive bond excludes dirt and the like from between the spring and the resilient members and so prevents abrasion damage to the spring. In the preferred embodiment of FIGS. 1 and 2, the upper resilient insert 60 has extensions 65A and 65B. Lower resilient insert 70 has extensions 75A and 75B. These extensions assist in maintaining tight contact between the resilient members and the leaf spring and aid in excluding dirt and the like from between the spring and the resilient members.

According to the preferred embodiment of the invention shown in the drawings, the resilient insert parts 60 and 70 each comprises two resilient support pads, one at each of the two longitudinal ends of the inner channel. In resilient insert 70 (resilient insert 60 being identical in this preferred embodiment), support pads 77A and 77B are seen to be longitudinally spaced from each other and extend laterally between the wedge insert side walls. The support pads each provides an upper surface 78A, 78B, respectively, which is higher than the inner surface of the bottom wall 79 between the two support pads. The support pads are adapted to contact and support the leaf spring and, accordingly, in assembly with a leaf spring there is a cavity formed between the leaf spring and the bottom wall of the wedge insert between the support pads. Cavities 90 and 92 can be seen in FIG. 2 between the leaf spring and the upper resilient insert 60 and between the leaf spring and the lower resilient insert 70, respectively. These cavities allow the leaf spring to be vertically displaced within the clamp without encountering resistance from the resilient material of the wedge insert. As seen in FIGS. 1 and 2, downward bending of the ends of the leaf spring would displace the center of the leaf spring within the leaf spring clamp assembly upwardly into the cavity 90 formed between the leaf spring and the upper resilient insert 60. In like manner, upward bending of the ends of the leaf spring would cause displacement of the leaf spring within the clamp assembly into the cavity 92 formed between the leaf spring and the lower resilient insert 70. The cavities allow the leaf spring to perform better and more nearly according to theoretical design specifications, since the bending of the leaf spring is not resisted by the wedge insert material which has been removed to form the cavities. Moreover, the forces between the clamp assembly and the leaf spring in resisting the bending forces applied to the leaf spring will be less concentrated and for this reason the leaf spring and clamp assembly will prove more durable and more resistant to failure. In view of the present disclosure, it will be understood that the support pads may be of various different shapes, for example semi-cylindrical, rather than the rectilinear configuration shown in FIGS. 1 and 2. It also will be understood that while the support pads are shown to be unitary with the resilient inserts, optionally they are separate components attached to the wedge insert or held in place by the compressive force of the clamp assembly. Additional suitable configurations will be apparent to the skilled of the art in view of the present disclosure. While the most advantageous dimensions for the upper and lower support pads will be determined in view of the intended application of each particular leaf spring assembly, it generally is preferred that the surface thereof intended to contact the leaf spring each extend longitudinally approximately 10%-30% of the overall longitudinal dimension of the inner channel.

The resilient insert(s) should tightly jacket the leaf spring and the convexities of the side walls thereof should be designed to engage and substantially fill the corresponding channel-widening concavities of the clamp base. The material of the insert(s) and the associated support pads generally should be of sufficient thickness and resilience to prevent undue stress concentration against the surface of the leaf spring, that is, to disperse pressures between the spring and the rigid components of the clamp. When used in the suspension system of a motor vehicle or other similar application, the inserts and support pads preferably are sufficiently thick to substantially dampen vibrations which otherwise would be transmitted from the axle through the leaf spring to the vehicle chassis. The resilient material also should be sufficiently tough to withstand the mechanical working of the clamp against the leaf spring and to protect the leaf spring against such mechanical working. Suitable materials for the inserts include, for example, natural rubber, suitable urethane rubbers, neoprenes, and the like. Preferably the resilient material is fabric reinforced, preferably cloth reinforced, since such reinforced materials have been found to provide excellent tear resistance, even following prolonged use. Most preferred is cloth reinforced urethane or neoprene. Natural rubber is less preferred when the clamp assembly is intended for use in the suspension system of a motor vehicle or other like environment in which it may be exposed to oil, gasoline and the like, in view of the poor resistance of natural rubber to these agents. Preferred typically for motor vehicle use is a urethane rubber having hardness equal to about 30–40 Shore D, and sufficient toughness to withstand prolonged mechanical working. Other resilient (materials suitable to provide the wedge function of the wedge insert and otherwise suitable for use in the preferred and alternative environments of the invention will be apparent to those skilled in the art in view of the present disclosure. In general, it will be within the ability of those skilled in the art, in view of the Present disclosure, to determine a suitable configuration and thickness for the wedge insert for use in leaf spring clamp assemblies according to the above-described or alternative embodiments of the present invention.

Clamp plate 40 is adapted to be fixedly attached to the clamp base to clamp the leaf spring between them within the above described inner channel of the wedge insert. Typically, the lower portion of the clamp plate would form a so-called spring seat attached to an axle member or other like component by any suitable means, such as by welding, bolts, etc. The present invention is characterized by means to hold together the clamp plate and clamp base to produce a compressive pre-load on the resilient inserts between them. More specifically, in the preferred embodiment shown in the drawings, clamp base 30 has side flanges 36A, 36B extending outwardly from the side walls 32A, 32B, respectively. The clamp plate 40 provides corresponding flange portions 46A, 46B corresponding to flanges 36A, 36B, respectively. The resilient wedge insert of the leaf spring clamp is put under compressive pre-load when the clamp base and clamp plate are brought together such that flanges 36A, 36B contact (or are brought proximate) the corresponding flange portions 46A, 46B, respectively, of the clamp Plate. To hold the clamp plate and clamp base together (i.e., with the clamp base flanges and the corresponding portion of the clamp plate in contact or nearly so) means are provided comprising a pin 37A, 37B extending from each side flange of the clamp base and a correspondingly sized and positioned hole 47A, 47B in each corresponding flange portion of the clamp plate 40. Thus, the pins are located so as to register with the holes. It will be obvious from this disclosure that, alternatively, the holding means may comprise Pins extending upwardly from the clamp plate and corresponding holes in the clamp base.

To fix the two rigid members proximate one another, they are brought together such that the pins extend through the corresponding holes According to a preferred embodiment, the clamp plate and clamp base are so designed that the resilient wedge insert is placed under an appropriate pre-selected compressive preload by bringing the flanges of the clamp base into actual contact with the corresponding flange portions of the clamp Plate. In this way a consistent and reproducible pre-load is achieved in a simple and cost efficient manner. After the pins have been inserted into the holes, the portion of each pin extending beyond the bottom surface 48 of the clamp plate is deformed such that it cannot be withdrawn. In this way, the two rigid members are fixedly attached to each other. The pins are deformed, preferably, by the known method of spin forming or spin riveting, wherein the pin is compressed longitudinally such that the face of the Pin is expanded radially. The face of the pin 49A, 49B is expanded to a diameter greater than the diameter of the hole such that it cannot pass through the hole. The clamp plate and clamp base are thereby locked together. An advantageous feature of the invention is that the spin riveter used to deform the pins generally would apply most or all of the compressive force for Closing the clamp assembly and compressively pre-loading the resilient wedge insert thereof. It will be appreciated that the pin-and-hole means of the present invention is an advantageous alternative to welding together the rigid members of the axle clamp assembly. Welding could easily cause heat damage to the resilient insert. The pin-and-hole means is also an advantageous alternative to the tab-and-slot means disclosed in above-mentioned, commonly assigned, U.S. Pat. No. 4,684,110 issued Aug. 4, 1987. Specifically, where the clamp plate or clamp base is to be formed of cast metal, rather than stamped metal for example, it is generally not readily possible to provide bendable tabs of sufficient strength. Whichever of these two rigid parts is to provide the holes, however, can be produced by metal stamping methods if the other design features thereof also are suitable for metal stamping.

An alternative embodiment of the invention is shown in FIG. 3. Specifically, clamp plate 140 and clamp base 130 are seen to comprise features and components corresponding to the like numbered features and components of the clamp plate 40 and clamp base 30, respectively, of the embodiment depicted in FIGS. 1 and 2. The embodiment of FIG. 3 differs, however, in that clamp base 130 comprises holes 137A and 137B (not shown), while clamp plate 140 comprises pins 147A and 147B correspondingly located to holes 137A and 137B to be received therein in the manner described for the embodiment of FIGS. 1 and 2. The assembly and operation of a leaf spring clamp assembly employing the clamp base 130 and clamp plate 140 of FIG. 3 would be according to the principles and procedures described above in connection with the embodiment of FIGS. 1 and 2.

The leaf spring clamp of the present invention is suitable for use in conjunction with leaf springs fabricated of metal, but is particularly advantageous for use with composite material leaf springs. Such composite materials typically comprise filler materials such as, for example, aramid fibers, graphite fibers, metal fibers, glass roving or other filamentary solids and/or non-filamentary solids. Glass roving is often preferred in view of the physical properties of the resulting leaf spring and in view of the ease and cost efficiency of manufacturing the leaf springs by filament winding techniques. The composite material further comprises an organic solid matrix such as, for example, polyester, epoxy or other suitable thermoset plastic or a suitable thermoplastic. As an alternative to filament winding, the leaf spring can be manufactured by pultrusion methods or by compression molding or other methods known to the skilled of the art.

The leaf spring clamp of the invention can be employed together with a suitable leaf spring in any application for which metal or composite material leaf springs are suitable, and can be used according to methods well known to the skilled of the art. Thus, for example, the leaf spring clamp can be used in the suspension system of a motor vehicle in conjunction with additional hardware. Preferably, the clamp base and clamp plate comprises suitable metal, for example steel. The rigid component which is provided with the deformable pins can be formed of cast metal, for example nodular iron (SAE D4512), which is preferred. Additional, materials and methods suitable for forming the clamp plate and clamp base will be apparent to the skilled of the art in view of the present disclosure. For stamped metal components, especially for the rigid component providing the pin-receiving holes, HSLA 950 steel is preferred. In certain applications these components can be formed of suitable synthetic material, for example filament reinforced thermoset plastic and the like.

While the invention has been shown and described in its preferred embodiment, it will be clear to those skilled in the art that changes and modifications can be made thereto without departing from the scope of the invention as defined in the appended claims.

INDUSTRIAL APPLICATION

It will be obvious from the foregoing that this invention has industrial applicability to suspension systems employing a leaf spring, especially a motor vehicle suspension system, and provides a leaf spring clamp wherein a leaf spring is prevented from shifting its position relative to a support member in a direction along the longitudinal axis of the leaf spring. In addition, the clamp of the present invention has industrial applicability to suspension systems other than for motor vehicles, for example, for stationary machines and devices, and further has industrial applicability to uses such as will be apparent in view of the present disclosure to those skilled in various related arts.

I claim:

1. A leaf spring clamp assembly adapted to secure a synthetic material leaf spring in position in a suspension system, which leaf spring has upper, lower and side surfaces, said leaf spring clamp assembly comprising:
   a rigid clamp base comprising a bottom wall and two substantially parallel side walls extending from said bottom wall to form therewith a channel, wherein the inner surface of at least one said side wall fairs from each longitudinal end into a channel-widening concavity;
   a resilient wedge insert adapted to be positioned within said channel, comprising a wedge insert bottom wall adapted to be positioned substantially parallel to and adjacent to said clamp base bottom wall, two substantially parallel side walls, each having an inner surface and an outer surface, and a wedge insert top wall extending between said wedge insert side walls and forming therewith and with said wedge insert bottom wall an inner channel adapted to substantially encircle said leaf spring laterally, wherein the inner surface of each said wedge insert side wall is adapted to be in substantial planar surface contact with one of said side surfaces of said leaf spring along substantially the entire longitudinal dimension of said inner channel, and the outer surface of each said wedge insert side wall is adapted to be in substantial planar surface contact with the corresponding clamp base side wall to substantially fill each channel-widening concavity thereof; and
   a clamp plate adapted, together with said clamp base, to hold said leaf spring between them, wherein said clamp plate and said clamp base together comprise means for holding themselves in assembly with each other to provide a compressive pre-load on said wedge insert sandwiched between them, said means comprising flanges extending outwardly from said clamp base side walls and flange portions extending outwardly from said clamp plate, said clamp plate flange portions corresponding to, and being substantially co-planar with, said flanges of said clamp base, each of said clamp base flanges providing one of a pin and a correspondingly positioned hole and each of said clamp plate flange portions providing the other of said pin and said correspondingly positioned hole, each said pin being sufficiently long to extend through said hole and being deformable to prevent withdrawal thereof from said hole.

2. The leaf spring clamp assembly of claim 1, wherein each of the two said flanges of said clamp base provides a single pin and each of the two said flange portions of said clamp plate provides a single correspondingly positioned hole.

3. The leaf spring clamp assembly of claim 2, wherein said clamp base is formed of cast metal.

4. The leaf spring clamp assembly of claim 1, wherein each of the two said flange portions of said clamp plate provides a single pin and each of the two said flanges of said clamp base provides a single correspondingly positioned hole.

5. The leaf spring clamp assembly of claim 4, wherein said clamp plate is formed of cast metal.

6. The leaf spring clamp assembly of claim 1, wherein said wedge insert comprises two substantially identical resilient inserts, one said resilient insert comprising said wedge insert bottom wall and the other said resilient insert comprising aid wedge insert top wall, and each said resilient insert comprising approximately one half of each said side wall.

7. The leaf spring clamp assembly of claim 1, wherein said wedge insert further comprises resilient support pads, one each of a first pair of said support pads being located at opposite longitudinal ends of said inner channel and both said support pads of said first pair having a contact surface adapted to contact and support said leaf spring upper surface, and one each of a second pair of said support pads being located at opposite longitudinal ends of said inner channel and both said support pads of said second pair having a contact surface adapted to contact and support said leaf spring lower surface, said contact surface of each support pad of said first pair being offset from the inner surface of said wedge insert top wall and said contact surface of each support pad of said second pair being offset from the inner surface of said wedge insert bottom wall.

8. The leaf spring clamp assembly of claim 7, wherein said wedge insert support pads are integral with said wedge insert.

9. The leaf spring clamp assembly of claim 1, wherein said resilient material comprises urethane rubber.

10. The leaf spring clamp assembly of claim 1, wherein said channel-widening concavity extends to a uniform lateral dimension over substantially the entire vertical dimension of said clamp base side wall at each longitudinal distance from the end of said channel.

11. The leaf spring clamp assembly of claim 1, wherein both said side walls of said clamp base provide a single channel-widening concavity longitudinally centered at approximately the longitudinal midpoint of said clamp base side walls.

12. A leaf spring clamp assembly comprising:
    a leaf spring having top and bottom surfaces each extending laterally and longitudinally, and side surfaces extending vertically and longitudinally, said leaf spring having a longitudinally central section of substantially constant cross-sectional size and shape and a terminal section of increasing lateral dimension extending longitudinally from each end of said central section;

a rigid clamp base comprising a top wall and two substantially parallel side walls extending downwardly from said top wall to form therewith a longitudinal channel, wherein each said side wall fairs from each longitudinal end of said channel into a single channel-widening concavity extending to a substantially uniform lateral dimension over substantially the entire vertical dimension of said clamp base side wall at each longitudinal distance from each longitudinal end of said channel;

a resilient wedge insert nested within said longitudinal channel, comprising a first resilient insert having a top wall and two substantially parallel side walls extending downwardly therefrom and forming therewith an inner channel upper portion, said top wall of said first resilient insert having an inner surface and an outer surface, said outer surface being positioned substantially parallel to and adjacent said clamp base top wall, said wedge insert further comprising a second resilient insert having a bottom wall and two substantially parallel side walls extending upwardly therefrom and forming therewith an inner channel lower Portion, said bottom wall of said second resilient insert having an inner surface and an outer surface, said inner channel lower portion together with said inner channel upper portion substantially encircling said leaf spring laterally, each said wedge insert side wall having planar surface contact with a corresponding side surface of said leaf spring over substantially the entire surface area of said leaf spring side surface within said inner channel, and each said wedge insert side wall having planar surface contact with the corresponding one of said clamp base side walls to substantially fill the channel-widening concavity thereof, said wedge insert further comprising resilient rectilinear support pads extending laterally between said side walls thereof, each of a first pair of said support pads being integral with said first resilient insert, one each at opposite longitudinal ends of said inner channel, and having a contact surface offset downwardly from said inner surface of said wedge insert top wall to be in planar surfaces contact with and support the leaf spring upper surface, and each of a second pair of said support pads being integral with said second resilient insert, one each at opposite longitudinal ends of said inner channel, and having a contact surface offset upwardly from said inner surface of said wedge insert bottom wall to be in planar surface contact with and support the leaf spring lower surface; and a clamp plate substantially coplanar with and adjacent to said second resilient insert bottom wall, said clamp plate and said clamp base together comprising means for holding themselves in assembly in contact with each other to provide a compressive pre-load on said wedge insert sandwiched between them, said means comprising flanges extending laterally outwardly from said clamp plate, said clamp plate flange portions corresponding to and substantially coplanar with said flanges of said clamp base, each of said clamp base flanges providing one of a pin and a correspondingly positioned hole and each of said clamp plate flange portions comprising the other of said pin and said correspondingly positioned hole, each said pin extending through a corresponding hole and being sufficiently deformed to prevent withdrawal thereof from said hole.

* * * * *